(12) United States Patent
Sawut et al.

(10) Patent No.: US 7,831,372 B2
(45) Date of Patent: Nov. 9, 2010

(54) FUEL INJECTION CONTROL METHOD OF ENGINE AND FUEL INJECTION CONTROL DEVICE FOR SAME

(75) Inventors: Umerujan Sawut, Kanagawa-ken (JP); Buso Takigawa, Kanagawa-ken (JP); Tohti Gheyret, Kanagawa-ken (JP)

(73) Assignee: Nikki Co., Ltd., Kanagawa (JP)

( * ) Notice: Subject to any disclaimer, the term of this patent is extended or adjusted under 35 U.S.C. 154(b) by 0 days.

(21) Appl. No.: 12/289,364

(22) Filed: Oct. 27, 2008

(65) Prior Publication Data
US 2009/0138178 A1      May 28, 2009

(30) Foreign Application Priority Data
Nov. 15, 2007   (JP)   ............... 2007-296218

(51) Int. Cl.
  *B60T 7/12*     (2006.01)
  *F02M 1/00*    (2006.01)
(52) U.S. Cl. .................. 701/103; 701/115; 123/434
(58) Field of Classification Search ................. 701/101, 701/103, 104, 105, 110, 114, 115; 123/434, 123/435, 436, 674, 683, 684
See application file for complete search history.

(56) References Cited

U.S. PATENT DOCUMENTS

| 6,223,730 | B1 * | 5/2001 | Hasegawa et al. ............ 123/491 |
| 6,382,188 | B2 * | 5/2002 | Hasegawa et al. ............ 123/491 |
| 2001/0008134 | A1 * | 7/2001 | Hasegawa et al. ............ 123/491 |

FOREIGN PATENT DOCUMENTS

JP      2005-140063        6/2005

* cited by examiner

*Primary Examiner*—John T Kwon
(74) *Attorney, Agent, or Firm*—Rader, Fishman & Grauer PLLC

(57) ABSTRACT

In a fuel injection control method of an engine which an intake air flow rate is estimated by a predetermined calculating method, using data on detected intake pipe pressure and engine rotating speed, a fuel injection time is determined by a predetermined calculating method, using the intake air flow rate, and a deviation from a target engine rotating speed, and an injector driving signal is outputted by a fuel injection control device, the fuel injection time is obtained by adding a battery voltage fluctuation correction time, and a transient correction injection time which corrects a deviation from the target engine rotating speed, which is obtained by a predetermined calculating method, to a basic injection time obtained by a predetermined calculating method.

12 Claims, 5 Drawing Sheets

FUEL INJECTION CONTROL METHOD OF ENGINE AND FUEL INJECTION CONTROL DEVICE FOR SAME

BACKGROUND OF THE INVENTION

1. Field of the Invention

The present invention relates to a fuel injection control method of an engine, and a fuel injection control device for carrying out the same and in particular, relates to a fuel injection control method of an engine which determines a fuel injection time by a predetermined calculating method on the basis of detected data, to thereby enable maintaining of a targeted engine rotating speed, and a fuel injection control device for executing the method.

2. Description of the Related Art

In the fuel injection control of an engine such as a multipurpose engine having a comparatively small and simple construction, it is usual that the fuel injection time is determined by reading map data of an intake air flow rate experimentally obtained in advance on the basis of the values of an engine rotating speed, an intake pipe pressure and so on. However, since there is no constant correlation among these detected values, it is indispensable to store a correction quantity for each parameter as a map in a memory. Further, since there are many nonlinear elements which are incorporated in an engine system, it is practically difficult to exactly execute a fuel injection control and an engine rotating speed control using the map in the described manner.

Taking the above situation into consideration, the inventors of the present application previously proposed, in Japanese Patent Application Laid-Open No. 2005-140063, a method of estimating the intake air flow rate by a predetermined calculation formula on the basis of an engine rotating speed and an intake pipe pressure, without using any map, and of determining a fuel injection time from the intake air flow rate to execute a fuel injection control. In addition to these data, a measure for estimating a more precise intake air flow rate by using data on an intake air temperature is also known.

That is to say, by deriving a predetermined formula on the basis of a given experimental verification about the physical relationship between the engine rotating speed and the intake pipe pressure, it is possible to execute control of the air-fuel ratio and an engine rotating speed while sequentially estimating the intake air flow rate. However, the control of the intake air flow rate at this case is performed by an electronic governor which controls opening and closing of a throttle valve. Hence, the fuel injection control must be delayed in time in comparison with the control that the electronic governor conducts, since a fuel injection time is determined by a negative pressure (an intake pipe pressure) generated by an intake air supplied to a downstream side of the throttle valve, and a target engine rotating speed.

Therefore, during s transient operation of an engine where an intake air flow rate and intake of fuel changes every moment, the control of the fuel injection quantity is delayed from the control of the intake air flow rate and therefore, may provide an adverse effect on the response to the target engine rotating speed. As a result, there is a problem such that it takes a long time for the engine rotating speed to converge into a target rotating speed, and an engine operability might be impaired.

SUMMARY OF THE INVENTION

The present invention was made to solve the above-mentioned problems, and an object thereof is to determine a fuel injection time for maintaining a target engine rotating speed corresponding to all operational conditions and to secure excellent engine operability, in the fuel injection control of an engine.

Thus, the present invention provides a fuel injection control method of an engine which estimates an intake air flow rate by a predetermined calculating method, using the values of detected intake pipe pressure and engine rotating speed, determines a fuel injection time by a predetermined calculating method, using the intake air flow rate, and a deviation of an actual engine rotating speed from a target engine rotating speed, and outputs an injector driving signal by a fuel injection control device. Here, the fuel injection time is obtained by adding a battery voltage fluctuation correction time, and a transient correction injection time which corrects the deviation of the actual engine rotating speed from the target engine rotating speed, which is obtained by a predetermined calculating method, to a basic injection time obtained by a predetermined calculating method.

As described above, by obtaining the sum of a basic injection time a battery voltage fluctuation correction period (invalid injection pulse), a transient correction injection time (transient correction pulse), which are respectively calculated by predetermined formulae, using an intake air flow rate estimated by a deviation between an actual engine rotating speed and a target engine rotating speed according to a predetermined formula, and executing model-based control which determines a final fuel injection time, the target engine rotating speed can be maintained with high precision while the final fuel injection time is determined only by a predetermined formula and transient correction to thereby eliminate the delay of control.

Further, in this fuel injection control method, the transient correction injection time to be used for calculation of the fuel injection time is calculated from the following Formula 1. According to this fact, it is possible to cope with all of the operating conditions including the transient operation by a transient correction element, and it becomes easy to maintain the target engine rotating speed with high precision.

$$T_u = k_1 e(t) + k_2 \int e(t)dt + k_3 \frac{de(t)}{dt} + k_4 \text{ sign}(s_f) \quad \text{[Formula 1]}$$

(where $T_u$ is the transient correction injection time, $e(t)$ is the deviation of the actual engine rotating speed from the target engine rotating speed, $k_1$ to $k_4$ are control parameters, and $s_f$ is control parameter.

Moreover, in the afore-mentioned fuel injection control method, the basic injection time to be used for calculation of the fuel injection time is calculated from the following Formula 2. Accordingly, it becomes easier to realize more exact control of the engine rotating speed.

$$T_p = \frac{b_1 Q_a 10^6}{60 b_2 N(A/F)} \quad \text{[Formula 2]}$$

(where $T_p$ is the basic injection time, N is the engine rotating speed, $Q_a$ is the intake air flow rate, $b_1$ and $b_2$ are constants, and A/F is a target air fuel ratio)

Furthermore, the present invention provides a fuel injection control device having such a configuration that storage means stores therein a fuel injection control program, and detection of data signals including output signals coming from engine rotating speed detecting means as well as intake pipe pressure detecting means are conducted to generate a fuel injection signal for maintaining the target engine rotating speed and to output the generated fuel injection signal to an injector, thereby executing the afore-mentioned fuel injection control method. Accordingly, by incorporating the above-described fuel injection control device in an engine system, it is possible to easily constitute a fuel injection system which is able to constantly maintain a target engine rotating speed depending on all engine operating conditions.

In addition, the fuel injection control device is adapted to open and close a throttle valve by a feedback method via an actuator so as to coincide with the target engine rotating speed on the basis of the actual engine rotating speed detected, and is further able to act as an intake air flow rate control device, whereby the intake air flow rate can be simultaneously controlled, and quick and high-precision control of the engine rotating speed can be realized.

By the present invention to which model-based control including a calculation sequence of determining an optimal fuel injection quantity in response to an intake air flow rate is applied, it is possible to determine a fuel injection time for maintaining a target engine rotating speed corresponding to all operational conditions including transient operation, and to surely obtain an improved engine operability.

DESCRIPTION OF PREFERRED EMBODIMENTS

Hereinafter, the invention will be described based on a best mode thereof, with reference to the accompanying drawings.

Figure 1:
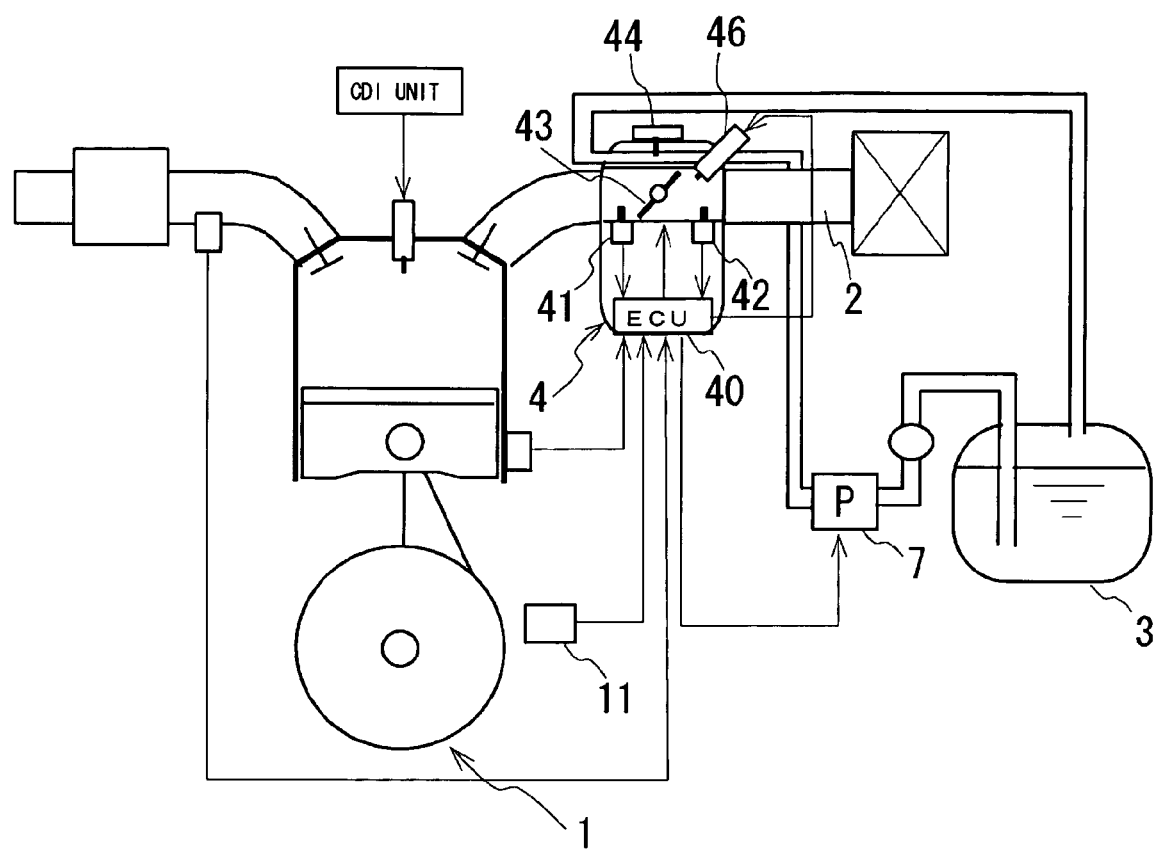
FIG. 1 is a block diagram illustrating a general arrangement of an embodiment of the invention.

FIG. 1 shows an arrangement of an engine system in which an electronic control unit 40 operating as a fuel injection control device which executes a fuel injection control method of the present embodiment is arranged. The purpose of control of the electronic control unit 40 in this fuel injection system is to control fuel injection quantity according to the intake air flow rate of an engine, and make the actual rotational speed of the engine follow a target engine rotating speed without delay under all operating conditions.

An electronic governor 4 integrally including a throttle valve 43 and an actuator (not shown) which performs opening and closing of the throttle valve, an injector 46, an intake pipe pressure sensor 41 serving as intake pipe pressure detecting means, an intake air temperature sensor 42, a pressure regulator 44, and an electronic control unit 40 are disposed in the middle of an intake pipe 2 of an engine 1.

A fuel supply pipe which extends from a fuel tank 3 and has a fuel pump 7 disposed in the middle thereof is connected to the injector 46 provided in the electronic governor 4. Further, a crank angle sensor 11 serving as engine rotating speed detecting means is disposed on the outer peripheral side of a flywheel of the engine 1 to output an engine rotation signal to the electronic control unit 40.

The electronic control unit 40 estimates the intake air flow rate of the engine 1, using a calculating method to be described later, on the basis of data on detected intake pipe pressure, engine rotating speed, intake air temperature, etc., without using a flow meter. The electronic governor 4 having the electronic control unit 40 operates opening and closing of the throttle valve 43 to control an intake air flow rate and an engine rotating speed, and the feature of the invention is in the contents of a fuel injection control method to be executed by the electronic control unit 40.

First, the intake air flow rate ($Q_a$) of the engine is obtained by assigning an intake pipe pressure (P), an engine rotating speed (N), and an intake air temperature ($T_a$), which are input to the electronic control unit 40, to the following Formulae 3, 4, and 5 (where $a_1$ to $a_5$ in Formula 4 are constants, and $V_h$ in Formula 5 is an engine capacity).

$$Q_a = \frac{PK_{spa}N\eta_v}{T_a 273.15}$$ [Formula 3]

$$\eta_v = \frac{a_1 + a_2 N - a_3 NP + a_a P}{120 a_5}$$ [Formula 4]

$$K_{spa} = \frac{0.104515 V_h}{1000}$$ [Formula 5]

In addition to using the value of the calculated intake air flow rate ($Q_a$), an input signal from the crank angle sensor 11 is fed back to obtain a deviation from a target engine rotating speed, and control of the intake air flow rate ($Q_a$) via a final fuel injection time ($T_i$) and the electronic governor 4 is performed.

That is, the electronic control unit 40 calculates, from the following Formula 6, the sum of a basic injection time ($T_p$) obtained from Formula 2, a transient correction injection time ($T_u$) obtained from Formula 1, a battery voltage fluctuation correction time ($T_s$), using the intake air flow rate ($Q_a$) of the engine, the engine rotating speed (N), and other correction elements, and determines the final fuel injection time ($T_i$).

$$T_i = T_p + T_u + T_s$$ [Formula 6]

The final fuel injection time ($T_i$) is determined according to the above sequence, and is output to the injector 46 as a driving signal, so that a fuel injection quantity for maintaining the target engine rotating speed according to the intake air flow rate ($Q_a$) can be supplied. That is, by performing such control, even during the transient operation where the engine revolution number is rapidly changed, any delay is not caused in control, and an actual engine rotational speed can follow a target engine rotating speed in the state of almost no steady-state error to the target engine rotating speed. As a result, high-precision control can be realized.

Figure 2A:
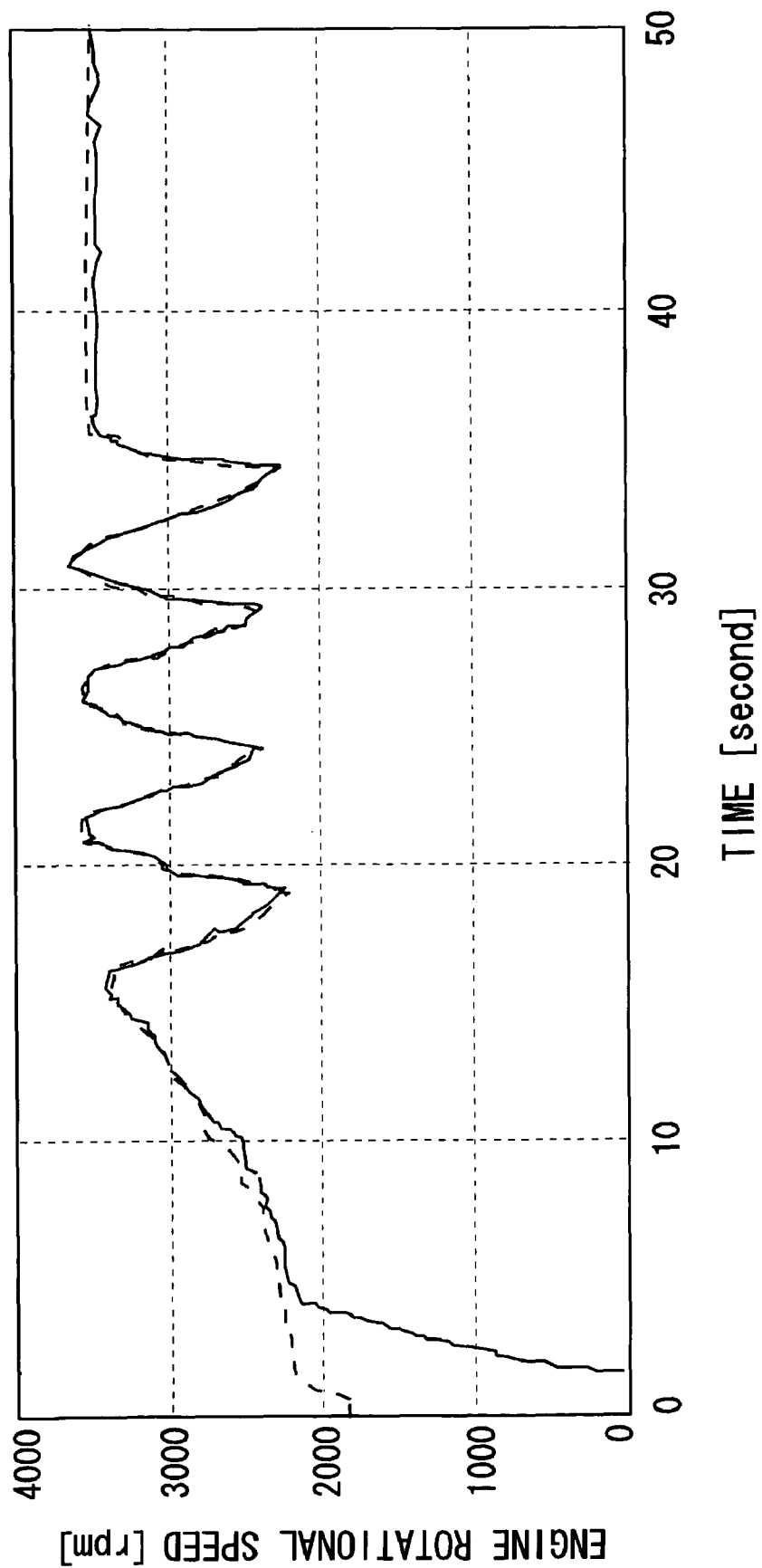
FIG. 2A is a graphical view illustrating control results by a fuel injection control device of FIG. 1.
Figure 2B:
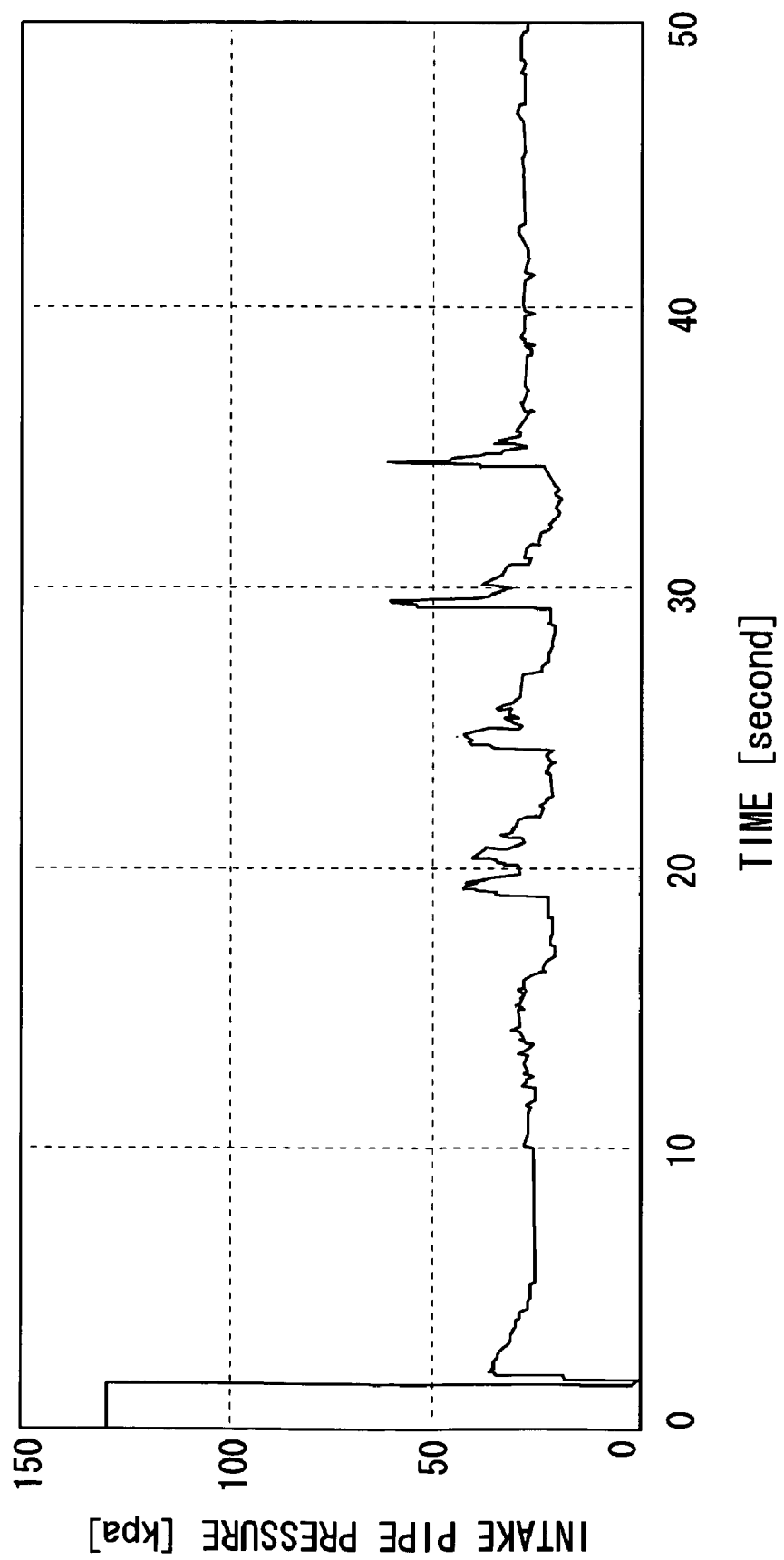
FIG. 2B is a graphical view illustrating control results by the fuel injection control device of FIG. 1.
Figure 3A:
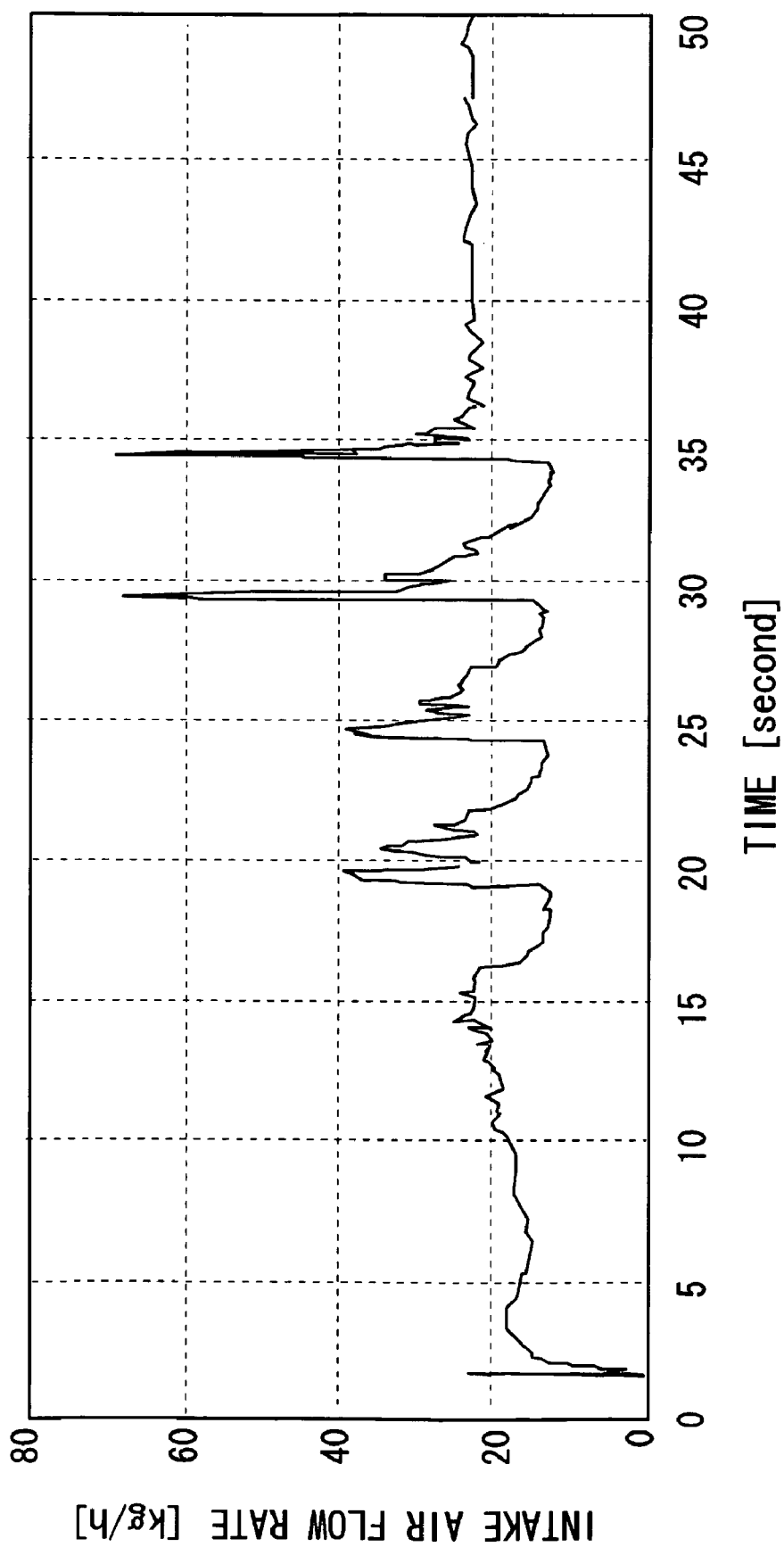
FIG. 3A is a graphical view illustrating control results by the fuel injection control device of FIG. 1.
Figure 3B:
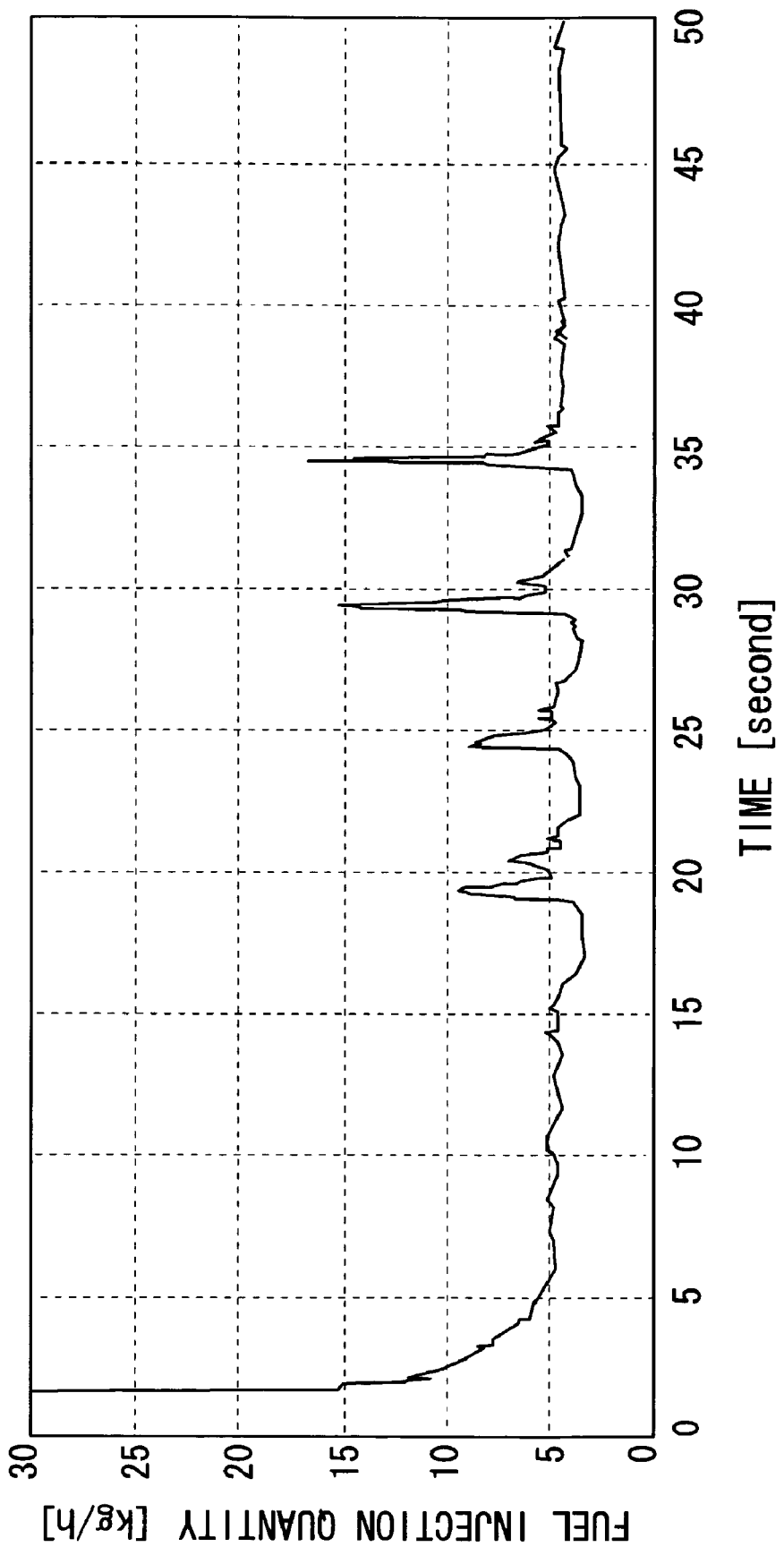
FIG. 3B is a graphical view illustrating control results by the fuel injection control device of FIG. 1.

In the graph of FIG. 2A illustrating experimental results by the fuel injection control method of this embodiment, a broken line represents a target engine rotating speed, and a solid line represents an actual engine rotating speed, and the graph of FIG. 2B shows the intake pipe pressure. The graph of FIG. 3A shows estimation values of the intake air flow rate according to this embodiment, and the graph of FIG. 3B shows a fuel injection quantity from the injector.

It is obvious from the experimental results that an actual engine rotating speed is constantly converged to a target engine rotating speed without occurrence of any delay therefrom, even if an engine is running at any operating condition thereof, and it can be understood that control of the engine rotating speed by the fuel injection control method of the present embodiment is very effective.

From the foregoing, it will be understood that, in accordance with the present invention, as for the fuel injection control of an engine, it is possible to perform a control depending on all of the operating conditions of the engine and to maintain a target engine rotating speed with high precision while securing excellent engine operability.

The invention claimed is:

1. A fuel injection control method of an engine in which an intake air flow rate is estimated by calculation using an intake air flow rate formula incorporating detected intake pipe pressure and engine rotating speed, a fuel injection time is determined by calculation using a fuel injection time formula incorporating the intake air flow rate, and a calculated deviation of an actual engine rotating speed from a target engine rotating speed, and a driving signal for an injector is outputted by a fuel injection control device, wherein the fuel injection time is the sum of a battery voltage fluctuation correction time plus a transient correction injection time which is corrected for the calculated deviation of the actual engine rotating speed from the target engine rotating speed plus a calculated basic injection time.

2. A fuel injection control method of an engine according to claim 1, wherein the transient correction injection time to be used for calculation of the fuel injection time is calculated from a formula as set forth below, $$T_u = k_1 e(t) + k_2 \int e(t)dt + k_3 \frac{de(t)}{dt} + k_4 \text{sign}(s_f)$$

where $T_u$ is the transient correction injection time, $e(t)$ is the deviation of the actual engine rotating speed from the target engine rotating speed, $k_1$ to $k_4$ are control parameters, and $Sf$ is control parameter.

3. A fuel injection control method of an engine according to claim 1, wherein the basic injection time to be used for calculation of the fuel injection time is calculated from a formula as set forth below, $$T_P = \frac{b_1 Q_a 10^6}{60 b_2 N(A/F)}$$

where $T_P$ is the basic injection time, N is the engine rotating speed, Qa is the intake air flow rate, $b_1$ and $b_2$ are constants, and A/F is a target air-fuel ratio.

4. A fuel injection control method of an engine according to claim 2, wherein the basic injection time to be used for calculation of the fuel injection time is calculated from a formula as set forth below, $$T_P = \frac{b_1 Q_a 10^6}{60 b_2 N(A/F)}$$

where $T_P$ is the basic injection time, N is the engine rotating speed, $Q_a$ is the intake air flow rate, $b_1$ and $b_2$ are constants, and A/F is a target air-fuel ratio.

5. A fuel injection control device for executing the fuel injection control method according to claim 1, wherein storage means stores therein computer-implemented fuel injection control program instructions for controlling fuel injection, and data signals including output signals coming from engine rotating speed detecting means and intake pipe pressure detecting means are detected to generate a fuel injection signal for maintaining the target engine rotating speed to thereby output said fuel injection signal to the injector.

6. A fuel injection control device for executing the fuel injection control method according to claim 2, wherein storage means stores therein computer-implemented fuel injection control program instructions for controlling fuel injection, and data signals including output signals coming from engine rotating speed detecting means and intake pipe pressure detecting means are detected to generate a fuel injection signal for maintaining the target engine rotating speed to thereby output said fuel injection signal to the injector.

7. A fuel injection control device for executing the fuel injection control method according to claim 3, wherein storage means stores therein computer-implemented fuel injection control program instructions for controlling fuel injection, and data signals including output signals coming from engine rotating speed detecting means and intake pipe pressure detecting means are detected to generate a fuel injection signal for maintaining the target engine rotating speed to thereby output said fuel injection signal to the injector.

8. A fuel injection control device for executing the fuel injection control method according to claim 4, wherein storage means stores therein computer-implemented fuel injection control program instructions for controlling fuel injection, and data signals including output signals coming from engine rotating speed detecting means and intake pipe pressure detecting means are detected to generate a fuel injection signal for maintaining the target engine rotating speed to thereby output said fuel injection signal to the injector.

9. A fuel injection control device according to claim 5, wherein the fuel injection control device is adapted to open and close a throttle valve by a feedback method via an actuator so as to coincide with the target engine rotating speed on the basis of the actual engine rotating speed being detected, and is configured to further operate as an intake air flow rate control device.

10. A fuel injection control device according to claim 6, wherein the fuel injection control device is adapted to open and close a throttle valve via an actuator so as to coincide with the target engine rotating speed on the basis of the actual engine rotating speed being detected, and is configured to further operate as an intake air flow rate control device.

11. A fuel injection control device according to claim 7, wherein the fuel injection control device is adapted to open and close a throttle valve via an actuator so as to coincide with the target engine rotating speed on the basis of the actual engine rotating speed being detected, and is configured to further operate as an intake air flow rate control device.

12. A fuel injection control device according to claim 8, wherein the fuel injection control device is adapted to open and close a throttle valve via an actuator so as to coincide with the target engine rotating speed on the basis of the actual engine rotating speed being detected, and is configured to further operate as an intake air flow rate control device.

* * * * *